Oct. 26, 1948. S. Y. WONG 2,452,414
CONCENTRATING AND REFINING FORMALDEHYDE SOLUTIONS BY
DISTILLATION WITH OXYGENATED HYDROCARBON DERIVATIVES
Filed July 27, 1945
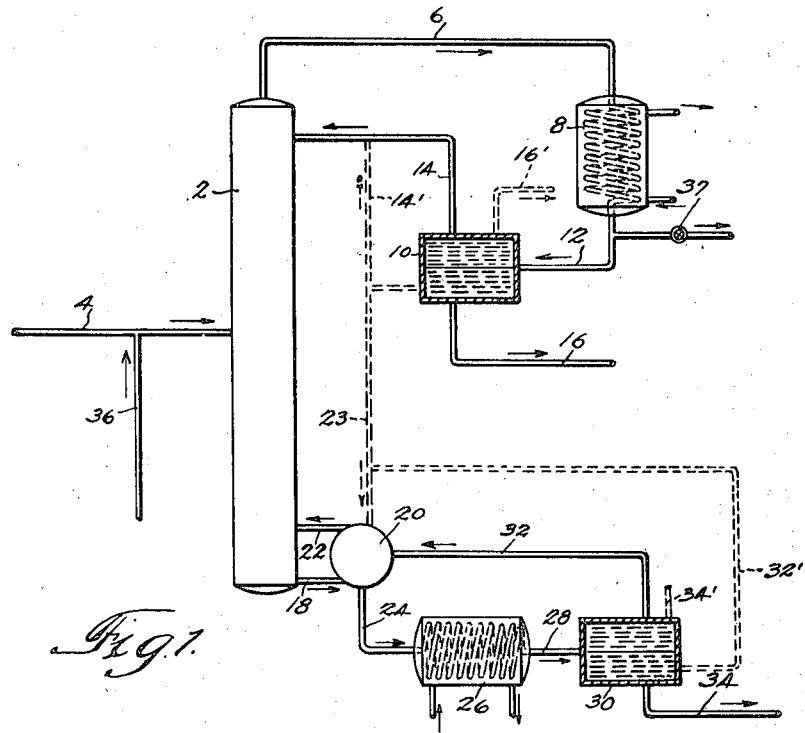
Fig. 1.
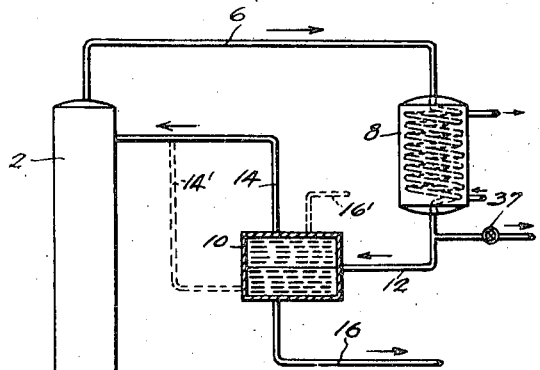
Fig. 2.
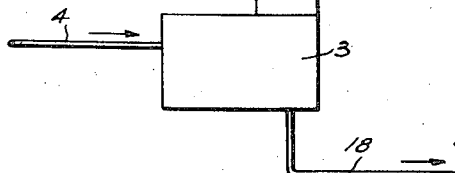

Patented Oct. 26, 1948

2,452,414

UNITED STATES PATENT OFFICE 2,452,414

CONCENTRATING AND REFINING FORMALDEHYDE SOLUTIONS BY DISTILLATION WITH OXYGENATED HYDROCARBON DERIVATIVES

Soon Y. Wong, Pawhuska, Okla., assignor to Skelly Oil Company, Tulsa, Okla., a corporation of Delaware Application July 27, 1945, Serial No. 607,463

16 Claims. (Cl. 202—42)

This invention relates to the concentration and refining of dilute aqueous solutions of formaldehyde. More specifically, this invention relates to the concentration and refining of dilute aqueous solutions of formaldehyde by azeotropic distillation methods with suitable azeotrope-formers hereinafter described, utilizing the phenomenon of heterogeneous azeotropism in a new, original and useful application. The invention also relates to the simultaneous concentration and refining of dilute aqueous solutions of formaldehyde containing impurities such as nonvolatile water-soluble bodies, and/or water-soluble high-boiling bodies.

The primary object of this invention is to provide an economical, commercially feasible and effective process whereby dilute aqueous solutions of formaldehyde may be concentrated, refined, and made into valuable products. It is also an object of this invention to provide a process of concentrating and refining dilute aqueous solutions of formaldehyde which may be applied advantageously and effectively to dilute solutions of a rather wide range of formaldehyde concentrations. It is a further object of this invention to provide a process whereby a solution of any desired formaldehyde concentration may be recovered essentially free from impurities associated with it in its original dilute and contaminated state. Still another object of this invention is to provide a process whereby dilute aqueous solutions of formaldehyde may be concentrated and refined in a continuous or semi-continuous process, but more preferably by a continuous process. Other objects and advantages of this invention will become apparent to those skilled in the art upon further reading of the disclosure and claims.

The present invention is illustrated by a drawing in which:

Figure 1 is a vertical elevation, partially in section, of an apparatus suitable for carrying out the invention in a substantially continuous manner; and Fig. 2 is a similar elevation of an apparatus suitable for batch operation of the process.

Data published in the literature have shown definitely that the formaldehyde present in aqueous solutions is mainly in the form of monohydrates and polymeric hydrates, and that only a small quantity of unhydrated monomeric formaldehyde exists in such aqueous solutions. It has also been concluded that the various molecular forms of these hydrates are stable and nonvolatile at normal temperatures, but at elevated temperatures, i. e. above 100° C., they become unstable and readily decompose, liberating the formaldehyde in the gaseous phase to a smaller or greater extent, depending upon the existing conditions. Re-solution and re-hydration of the liberated gaseous formaldehyde take place readily upon contact with water, reproducing an aqueous solution of formaldehyde.

It has been discovered that if dilute aqueous solutions of formaldehyde are distilled in a suitable fractionating column of conventional design, at temperatures above 100° C. and at the corresponding superatmospheric pressures, in the presence of a suitably selected azeotropic agent capable of forming a heterogeneous azeotrope with water, there are produced solutions of desired formaldehyde concentrations which are greater than the formaldehyde concentrations of the original dilute aqueous solutions. These desired formaldehyde concentrations may be, for example, 37.5 or more weight per cent of formaldehyde.

In essence, my invention utilizes the phenomenon of heterogeneous azeotropism in a new and original application. More specifically, a dilute aqueous solution of formaldehyde is distilled in a suitable fractionating column of conventional design in the presence of an azeotropic agent capable of forming a heterogeneous azeotrope with water, at temperatures exceeding 100° C. and at the corresponding pressures. Under such conditions the formaldehyde hydrates present in the said dilute aqueous solution are decomposed, thus allowing the formaldehyde to volatilize. Furthermore, the quantity of water appearing in the final distillate is limited, controlled, and regulated to azeotropic proportions by the action of the added azeotropic agent, which functions as the heterogeneous azeotrope-former. The over-all result of this distillation at elevated temperatures and corresponding elevated pressures in the presence of such an azeotropic agent is the production of a vapor mixture in which the weight-ratio of formaldehyde to water is much greater than the corresponding weight-ratio of formaldehyde to water of the original dilute solution. Condensation of the binary heterogeneous azeotrope of the added azeotropic agent and water in the presence of the liberated and gaseous formaldehyde results in a re-absorption, re-solution, and re-hydration of said gaseous formaldehyde by the aqueous portion of the distillate, and separation into a phase comprising the azeotropic agent and a phase comprising a formaldehyde solution whose formaldehyde concentration is greater than that of the original dilute aqueous solution. The condensed azeotropic agent and obtained formaldehyde solution are most suitably separated by gravity. The separated azeotropic agent is returned by conventional methods as reflux to the distillation system, and the aqueous formaldehyde solution of desired concentration is withdrawn as a distillate product. Nonvolatile and high-boiling impurities are rejected with the waste water as residues.

The wide applicability of this invention for producing formaldehyde solutions of any desired formaldehyde concentrations from dilute aqueous solutions of formaldehyde of a rather wide range of formaldehyde concentrations is evident, since the weight-ratio of formaldehyde to water in the overhead vapors may be limited, controlled, and regulated to any desired value primarily by the choice of the proper azeotropic agent to form the required heterogeneous azeotrope with water, and, secondarily, by the control of the operating conditions and variables such as charge rates, heat input, reflux ratios, and temperatures.

Therefore, this invention, speaking broadly, is a process for concentrating and refining dilute aqueous solutions of formaldehyde, the said process comprising the distilling of dilute aqueous solutions of formaldehyde in a suitable fractionating column of conventional design, at temperatures above 100° C. and pressures corresponding to the temperatures of distillation, with an azeotropic agent capable of forming a heterogeneous azeotrope with water, limiting, controlling, and regulating the amount of water in the final distillate primarily by the use of the added azeotropic agent, said amount of water being the quantity such that the weight-ratio of formaldehyde to water is at the desired value, said value being greater than that of the corresponding ratio of formaldehyde to water of the original dilute aqueous solutions, condensing the condensable overhead vapors, causing a re-solution, re-absorption, and re-hydration of the formaldehyde liberated from the said dilute aqueous solutions by the aqueous portion of the distillate, separating the obtained formaldehyde solutions from the azeotropic agent, returning the separated azeotropic agent as reflux to the fractionating column, and withdrawing as a distillate product formaldehyde solutions of desired formaldehyde concentrations which are greater than those of the starting dilute aqueous solutions, and withdrawing the still residues composed essentially of water and nonvolatile and high-boiling impurities.

The preferred distillation temperatures range from 102° C. to 150° C., depending upon various factors such as the particular azeotropic agent employed, formaldehyde concentration of the dilute aqueous solution of formaldehyde, final formaldehyde concentration of the desired product, and the optimum and most economical per cent recovery of total formaldehyde. For a given dilute aqueous solution of formaldehyde being concentrated in the presence of a specified azeotropic agent to a formaldehyde solution of a desired formaldehyde concentration under given operating conditions, the preferred optimum temperature is the lowest temperature at which substantially all the formaldehyde, as such, in the dilute aqueous solution is liberated from its original state of hydration and solution and ultimately recovered as a distillate product. Temperatures in excess of the preferred range may be used, however, and they are not specifically precluded from the scope of this invention, but said excessively high temperatures will not be so advantageous in many respects as the lower preferred temperatures.

The pressures which may be employed in the practice of this invention depend mainly upon the temperature of distillation, the partial pressure of the azeotropic agent used, the partial pressure of water, and the partial pressure of gaseous formaldehyde present as such, all at the prevailing temperature of distillation. For economical reasons, distillation pressures should not exceed 200 lbs. per square inch gauge. Pressures within the range from 10 lbs. per square inch gauge to 150 lbs. per square inch gauge are preferred.

The condensed azeotropic agent is preferably returned as reflux to the distillation system. Depending upon the concentration of the dilute aqueous solution of formaldehyde being concentrated, the specific azeotropic agent used, the temperature of the distillation, the desired formaldehyde concentration of the formaldehyde solution withdrawn as product, and other operating conditions in existence, a reflux composed of a portion of the formaldehyde solution distillate may be used in conjunction with the azeotropic agent returned as reflux. This is to say that for any given and defined system of operation, it may be advantageous, desirable, preferable or necessary to use part of the formaldehyde solution distillate as reflux with the azeotropic agent. The primary purpose of such reflux is to aid in maintaining the desirled weight-ratio of formaldehyde to water in the distillate and/or to correct an unfavorably displaced ratio to the ratio desired.

The azeotropic agents employed are oxygen-containing hydrocarbon derivatives. Essential requirements of such hydrocarbon derivatives containing oxygen, and boiling between about 70° C. and 300° C. and which are suitable for use as azeotropic agents, are that they must be capable of forming heterogeneous azeotropes with water, and be relatively insoluble in water and/or formaldehyde solutions, essentially nonreactive with respect to water and formaldehyde under the conditions of operation, stable at the temperatures and pressures at which they may be employed, and exist in the liquid state at operating temperatures and pressures.

It is not desired to limit this invention to any oxygen-containing hydrocarbon derivative of any specified boiling range, except to those limitations and requirements specified in the above paragraph and the appended claims, as the oxygen-containing hydrocarbon derivative to be most advantageously employed will depend largely upon the formaldehyde concentration of the dilute aqueous formaldehyde solutions to be concentrated, the desired formaldehyde concentrations of the product, and the particular conditions under which the process of this invention is to be conducted. Any oxygen-containing hydrocarbon derivative meeting the essential requirements given in the previous paragraph, therefore, will be considered to be within the scope of this invention.

A few examples of oxygen-containing hydrocarbon derivatives found suitable for use as azeotropic agents in this process are hydrocarbon derivatives containing oxygen, and boiling between about 70° C. and 300° C., such as the ketones, for example: di-isopropyl ketone, methyl n-amyl ketone, ethel iso-amyl ketone, di-propyl ketone, iso-butyl propyl ketone, iso-amyl methyl ketone, butyl methyl ketone, hexyl methyl ketone, amyl ethyl ketone, and ethyl butyl ketone; the esters such as: amyl acetate, iso-amyl acetate, cyclohexyl acetate, amyl formate, butyl formate, amyl butyrate, butyl butyrate, and amyl propionate; the ethers, such as: amyl ether, iso-amyl ether, benzyl butyl ether, benzyl ethyl ether, ethyl benzyl ether, ethyl iso-amyl ether, ethyl octyl ether and heptyl methyl ether. Other methods of concentrating formaldehyde solutions are described and claimed in my co-pending applications Serial No. 607,461, Serial No. 607,462, and Serial No. 607,464, respectively, filed of even date herewith.

To illustrate the results obtained by the process of the present invention, the following specific examples are given, said examples being two of several variations of the many possible methods of conducting the process of this invention.

EXAMPLE I (BATCH PROCESS)

Five hundred milliliters of a dilute aqueous formaldehyde solution containing 20.6% by weight formaldehyde were initially charged into the kettle of a packed fractionating column 2 through pipe 4. (See Fig. 2.) Six hundred milliliters of an azeotropic agent, namely amyl acetate, were also introduced, together with the dilute aqueous formaldehyde solution, through said pipe. The amount of amyl acetate thus charged was in excess of requirements, which was done to insure the presence of a sufficient amount of liquid in the kettle or lower portion of the column 2 as the operation approached its conclusion, so as to prevent damage by overheating due to an insufficient amount of liquid. Essentially all the amyl acetate was returned as reflux through pipe 14 for re-use in the process, after condensation and phase separation from the formaldehyde solution obtained during the condensation. Heat was applied to the kettle 3 (lower part) of the column 2 and the column was purged of air through a relief valve 37 installed on the end of condenser 8. After essentially all the air was displaced from the column, the relief valve 37 was shut and the column 2 was allowed to reach the desired operating temperature and pressure. Vapors consisting of formaldehyde and of the amyl acetate and water in azeotropic proportions were removed from the top of the column through pipe 6 and conducted to a water-cooled condenser 8, wherein condensation of the azeotropic vapor to again form liquid amyl acetate and water was effected, with subsequent resolution, re-absorption, and re-hydration of the uncondensed formaldehyde gas in the resulting aqueous portion of the resulting condensate.

The total condensate was then conducted through pipe 12 to a phase separator 10 wherein the amyl acetate was separated from the obtained strong formaldehyde solution. The upper liquid layer consisted of amyl acetate, while the bottom liquid layer consisted of the concentrated aqueous formaldehyde solution. All of the amyl acetate thus separated was returned as reflux to the column through pipe 14 along with a portion of the obtained and separated formaldehyde solution. After the column 2 reached the desired temperature and pressure, twelve separate portions of the separated strong formaldehyde solution were removed from the distillation system for analysis, by withdrawal from the phase separator 10 through pipe 16. An average reflux ratio of 20:1 was used. The kettle residues were not recovered.

The data and results obtained in the run are summarized and given in Table I.

TABLE I

Summary of data and results, Example I

Azeotropic agent used_____ Amyl acetate
Average kettle temp., °C_____ 142.4
Average overhead temp., °C_____ 132.3
Average pressure, p. s. i. g_____ 58.0
Charge stock:
 Volume ml_____ 500.0
 Weight percent formaldehyde_____ 20.6

| Fraction No. | Volume, Milliliters | Weight Per Cent Formaldehyde |
|---|---|---|
| 1 | 25 | 23.9 |
| 2 | 25 | 32.3 |
| 3 | 25 | 34.4 |
| 4 | 25 | 34.3 |
| 5 | 25 | 32.9 |
| 6 | 25 | 34.0 |
| 7 | 25 | 34.1 |
| 8 | 25 | 29.7 |
| 9 | 25 | 22.3 |
| 10 | 25 | 15.7 |
| 11 | 30 | 10.7 |
| 12 | 25 | 10.4 |

EXAMPLE II (BATCH PROCESS)

Five hundred milliliters of a dilute aqueous formaldehyde solution containing 20.6% by weight formaldehyde were initially charged into the kettle of a packed fractionating column 2 through pipe 4. Six hundred milliliters of an azeotropic agent, namely methyl n-amyl ketone, were also introduced, together with the dilute aqueous formaldehyde solution, through said pipe. The amount of methyl n-amyl ketone thus charged was in excess of requirements, which was done to insure the presence of a sufficient amount of liquid in the kettle or lower portion of the column 2 as the operation approached its conclusion, so as to prevent damage by overheating due to an insufficient amount of liquid. Essentially all the methyl n-amyl ketone was returned as reflux through pipe 14 for reuse in the process after condensation and phase separation from the formaldehyde solution obtained during the condensation. Heat was applied to the kettle of the column and the column was purged of air through a relief valve 37 installed on the end of condenser 8. After essentially all the air was displaced from the column, the relief valve 37 was shut and the column 2 was allowed to reach the desired operating temperature and pressure. Vapors consisting of formaldehyde and of the methyl n-amyl ketone and water in azeotropic proportions were removed from the top of the column through pipe 6 and conducted to a water-cooled condenser 8, wherein condensation of the azeotropic vapor to again form liquid methyl n-amyl ketone and water was effected, with subsequent re-solution, re-absorption, and re-hydration of the uncondensed formaldehyde gas in the resulting aqueous portion of the resulting condensate.

The total condensate was then conducted through pipe 12 to a phase sepaartor 10 wherein the methyl n-amyl ketone was separated from the obtained strong formaldehyde solution. The upper liquid layer consisted of methyl n-amyl ketone while the lower liquid layer consisted of the concentrated aqueous formaldehyde solution. All of the methyl n-amyl ketone thus separated was returned as reflux to the column through pipe 14 along with a portion of the obtained and separated formaldehyde solution. After the column 2 reached the desired temperature and pressure, eleven separate portions of the separated strong formaldehyde solution were removed from the distillation system for analysis by withdrawal from the phase separator 10 through pipe 16. A reflux ratio of about 20:1 was used.

The data and results obtained in the run are summarized and given in Table II.

TABLE II

*Summary of data and results, Example II*

Azeotropic agent used____ Methyl n-amyl ketone
Average kettle temp., °C_____ 139.7
Average overhead temp., °C_____ 134.0
Average pressure, p. s. i. g_____ 48.0
Charge stock:
    Volume ml_____ 500.1
    Weight per cent formaldehyde_____ 20.6

| Fraction No. | Volume, Milliliters | Weight Per Cent Formaldehyde |
|---|---|---|
| 1 | 25 | 30.4 |
| 2 | 25 | 40.5 |
| 3 | 25 | 42.5 |
| 4 | 25 | 42.8 |
| 5 | 25 | 43.5 |
| 6 | 25 | 39.8 |
| 7 | 25 | 21.1 |
| 8 | 30 | 12.0 |
| 9 | 25 | 8.0 |
| 10 | 25 | 3.9 |
| 11 | 25 | 2.8 |
| Still Residues | 205 | |

To further illustrate the results obtained by the process of this invention, the following specific example is given, said example being one variation of the many possible methods of conducting the process of this invention in a continuous manner.

EXAMPLE III (CONTINUOUS PROCESS)

6,600 milliliters of a dilute aqueous solution of formaldehyde containing 20.6% by weight formaldehyde were continuously charged at the rate of 825 milliliters per hour into a packed column to which had been initially charged approximately 1,500 milliliters of the azeotropic agent methyl n-amyl ketone. It was found by previous experimentation that the 1,500 milliliters of methyl n-amyl ketone was sufficient to be effective throughout the column and to maintain a methyl n-amyl ketone phase in the reboiler. Preheated formaldehyde solution, ranging in temperature from about 142–145° C. at a pressure of about 55 lbs. per square inch gauge, was charged to the column at a point approximately three-fifths the vertical length of the column from the bottom. The distillation system was operated at an average pressure of 48 lbs. per square inch gauge with an average overhead temperature of 134° C. and a reboiler temperature of 145° C.

Sufficient heat was supplied to the reboiler to create vaporization of the reflux. Vapors, consisting of methyl n-amyl ketone and water in azeotropic proportions, and of formaldehyde, were removed from the top of the column and conducted to a watercooled condenser, wherein condensation of the azeotropic vapor consisting of methyl n-amyl ketone and water was effected with resulting re-solution, re-absorption, and re-hydration of the uncondensed formaldehyde vapors in the aqueos portion of the distillate. The total condensate was then conducted to a phase separator wherein the condensed methyl n-amyl ketone was separated from the aqueous portion of the condensate by gravity. Eight fractions of 340 milliliters each were withdrawn at a constant rate for formaldehyde analysis, and in addition to these distillate fractions eight fractions of the aqueous portion of the reboiler's contents were continuously cooled, separated in another phase separator, and withdrawn at a constant rate for formaldehyde analysis. Any methyl n-amyl ketone separated out during this operation was suitably returned to the reboiler of the column. The data and results of this run are given in Table III.

TABLE III

*Summary of data and results, Example III*

Azeotropic agent used____Methyl n-amyl ketone
Average reboiler temp., °C_____ 145.0
Average overhead temp., °C_____ 134.0
Average pressure, p. s. i. g_____ 48.0

| Fraction No. | Distillate | | | Residues | | |
|---|---|---|---|---|---|---|
| | Vol. | Wt. percent $CH_2O$ | Wt. $CH_2O$ | Vol. | Wt. percent $CH_2O$ | Wt. $CH_2O$ |
| 1 | 340 | 42.5 | 160.0 | 480 | 0.9 | 4.3 |
| 2 | 340 | 42.8 | 161.1 | 485 | 0.6 | 2.9 |
| 3 | 340 | 42.3 | 154.2 | 475 | 1.0 | 4.8 |
| 4 | 340 | 42.5 | 160.0 | 480 | 0.9 | 4.3 |
| 5 | 340 | 42.6 | 160.3 | 485 | 1.0 | 4.9 |
| 6 | 340 | 42.1 | 158.5 | 480 | 0.8 | 3.8 |
| 7 | 340 | 42.7 | 160.7 | 490 | 1.0 | 4.9 |
| 8 | 340 | 42.5 | 160.0 | 485 | 0.9 | 4.4 |

Total formaldehyde charged_____grams__ 1445.6
Total formaldehyde recovered_____do____ 1312.1
Recovery of formaldehyde by weight
                                per cent__ 90.8

EXAMPLE IV

For a clearer understanding of the continuous operation, a complete cycle of operations will be described in connection with Fig. 1. Thus, a dilute aqueous solution of formaldehyde of essentially constant composition is charged through pipe 4 continuously to a conventional design type fractionating column 2. In the fractionating column 2 there is initially charged through pipes 36 and 4 an azeotropic agent having a specific gravity lower than that of the water-formaldehyde solution, and capable of forming a heterogeneous azeotrope vapor with the water of the dilute aqueous formaldehyde solution. Heat is applied to the mixture, and, as the temperature in the fractionating column exceeds 100° C., vapors, apparently comprising formaldehyde and an azeotrope comprising the azeotropic agent and water, are withdrawn from the top of the fractionating column 2 through pipe 6 and are condensed in condenser 8. At the temperature to which the condensate is cooled, the condensate forms an azeotropic agent phase and a water-formaldehyde phase; the cooled condensate is then passed through pipe 12 into a separator 10, substantially at the vertical center thereof. The water-formaldehyde phase of desired formaldehyde concentration settles to form a lower layer and the azeotropic agent phase rises to form an upper layer. The formaldehyde solution, i. e. the lower layer, is withdrawn through pipe 16 to storage, and the azeotropic agent, i. e. the upper layer, is withdrawn through pipe 14 and returned as reflux to fractionator 2. Liquid phase azeotropic agent and aqueous residue are conducted from fractionator 2 through pipe 18 to reboiler 20. Vapors generated in reboiler 20 are passed to fractionator 2 through pipe 22. Some of the aqueous residue phase is withdrawn from reboiler 20 through pipe 24 to cooler 26 where it is cooled and then withdrawn through pipe 28 to a second phase separator 30. Any azeotropic agent separated out therein is removed from the phase separator 30 and returned to reboiler 20 through pipe 32. The final residue, consisting essentially of water and associated impurities, is withdrawn from the separator 30 through pipe 34 and discarded. Make-up azeotropic agent is added, when necessary, through pipes 36 and 4.

It will be understood by those skilled in the art that when the heterogeneous azeotropic agent used has a greater specific gravity than water or formaldehyde solution the lower phase of the condensate comprises predominantly the azeotropic agent, while the upper phase comprises predominantly formaldehyde solution. It will be further understood that in this modification of the invention the azeotropic agent will be returned to the fractionating column through pipe 14′ to pipe 14 as reflux, or through pipe 23 to the reboiler 20 as make-up azeotropic agent stock. The formaldehyde solution will be removed from separator 10 through alternate pipe 16′. A corresponding change will then also be required in connection with separator 30, as the azeotropic agent, being heavier than the aqueous layer, will be returned to the reboiler 20 through alternate pipes 32′ and 23, while the upper layer of final residue will be withdrawn through alternate pipe 34′.

While I have described the principles of my process for the concentration of dilute aqueous solutions of formaldehyde, it is to be understood that the illustrations and examples are merely to clarify the general mode of operation, and that this invention is not limited to specific details of temperature, pressures, weight ratios, azeotropic agents or specific apparatus except as defined in the appended claims.

Having described my invention, I claim:

1. In a process of refining and concentrating dilute aqueous solutions of formaldehyde, the steps of distilling, at a temperature in excess of 100° C., said dilute aqueous solutions together with an oxygen-containing hydrocarbon derivative boiling between about 70° C. and 300° C., substantially insoluble in water but capable of forming a heterogeneous azeotrope therewith, and collecting the overhead formaldehyde vapors and condensing them as formaldehyde solution of greater concentration than that of said dilute aqueous solutions.

2. In a process of refining and concentrating dilute aqueous solutions of formaldehyde, the steps of distilling, at a temperature in excess of 100° C., said dilute aqueous solutions together with an oxygen-containing hydrocarbon derivative boiling between about 70° C. and 300° C., substantially insoluble in water but capable of forming a heterogeneous azeotrope therewith, withdrawing the overhead vapors, condensing and cooling the said overhead vapors, thus effecting a re-solution of the formaldehyde in the aqueous portion of the condensate to form a liquid oxygenated hydrocarbon phase and a formaldehyde-water phase of greater formaldehyde concentration than that of said dilute aqueous solutions, withdrawing the liquid oxygenated hydrocarbon phase and returning it to the distillation for further use.

3. In a process for concentrating and refining dilute aqueous solutions of formaldehyde by distilling, at a temperature in excess of 100° C., said dilute aqueous solutions in a distilling zone together with an oxygenated hydrocarbon derivative boiling between about 70° C. and 300° C., substantially insoluble in water but capable of forming a heterogeneous azeotrope therewith, to form overhead vapors comprising formaldehyde, oxygenated hydrocarbon and water (the latter two being in azeotropic proportions), leaving excess water and associated impurities as a kettle product, withdrawing, condensing and cooling the said overhead vapors thereby causing a re-solution of the formaldehyde vapors in the aqueous portion of the resulting condensate, separating the condensate mixture of liquid oxygenated hydrocarbon and aqueous formaldehyde into a formaldehyde solution layer of greater formaldehyde concentration than that of said dilute aqueous solutions, and a liquid oxygenated hydrocarbon layer, withdrawing the liquid oxygenated hydrocarbon layer and returning it directly to the said distillation zone.

4. A continuous process for concentrating and refining dilute aqueous solutions of formaldehyde by distilling, at a temperature in excess of 100° C., said dilute aqueous solutions in a distilling zone together with an oxygenated hydrocarbon derivative boiling between about 70° C. and 300° C., substantially insoluble in water but capable of forming a heterogeneous azeotrope therewith, to form overhead vapors comprising oxygenated hydrocarbon and water in azeotropic proportions, and formaldehyde, continuously withdrawing, as a kettle product, excess water and associated impurities, continuously withdrawing, condensing and cooling the said overhead vapors, and causing a re-solution of the formaldehyde vapors in the aqueous portion of the condensate, separating the oxygenated hydrocarbon-formaldehyde-water condensate into a formaldehyde solution layer and a liquid oxygenated hydrocarbon layer, continuously withdrawing the liquid oxygenated hydrocarbon layer and returning it directly to the said distillation zone as reflux, and withdrawing the formaldehyde solution layer of greater formaldehyde concentration than that of said dilute aqueous solutions from the distillation process.

5. In a process for concentrating and refining a dilute aqueous solution of formaldehyde, the steps of distilling, at a temperature above 100° C., said solution together with an oxygenated hydrocarbon derivative boiling between about 70° C. and 300° C. and capable of forming a heterogeneous azeotrope with water, leaving as a kettle product excess water and associated impurities, regulating the amount of water in the overhead vapors by the use of the oxygenated hydrocarbon, condensing and cooling the hydrocarbon-water-formaldehyde overhead vapors which effect a re-solution of the uncondensed formaldehyde in the aqueous portion of the condensate, separating the hydrocarbon-water condensate into a concentrated formaldehyde solution layer and a liquid oxygenated hydrocarbon layer, withdrawing the liquid oxygenated hydrocarbon layer and returning it to the distillation as reflux.

6. In a process for concentrating and refining dilute aqueous solutions of formaldehyde, the steps of distilling, at a temperature greater than 100° C., said solutions in a distillation zone together with an oxygenated hydrocarbon derivative boiling between about 70° C. and about 300° C. and capable of forming a heterogeneous azeotrope with water, leaving a kettle product of excess water and associated impurities, regulating the amount of water in the overhead vapors by the use of the oxygenated hydrocarbon, condensing and cooling the oxygenated hydrocarbon-water-formaldehyde overhead vapors, thus effecting a re-solution of the uncondensed formaldehyde in the aqueous portion of the condensate, separating the oxygenated hydrocarbon-formaldehyde-water condensate into a formaldehyde solution layer of greater formaldehyde concentration than the original dilute aqueous solutions of formaldehyde and a liquid oxygenated hydrocarbon layer, withdrawing the liquid oxygenated hydrocarbon layer and returning it directly to the said distillation zone as reflux, and withdrawing and recovering the said formaldehyde solution layer from the distillation process.

7. In a process for concentrating and refining dilute aqueous solutions of formaldehyde, the steps of distilling, at a temperature greater than 100° C., said solutions in a distillation zone together with an oxygenated hydrocarbon derivative boiling between about 70° C. and about 300° C. which is substantially immiscible with water, leaving a kettle product of excess water and associated impurities, regulating the amount of water in the overhead vapors by the use of the oxygenated hydrocarbon, condensing and cooling the oxygenated hydrocarbon-water-formaldehyde overhead vapors, thus effecting a re-solution of the uncondensed formaldehyde in the aqueous portion of the condensate, separating the oxygenated hydrocarbon-formaldehyde-water condensate into a formaldehyde solution layer of greater formaldehyde concentration than the original dilute aqueous solutions of formaldehyde and a liquid oxygenated hydrocarbon layer, withdrawing the liquid oxygenated hydrocarbon layer and returning it to the said distillation zone as reflux, and withdrawing and recovering the said formaldehyde solution layer from the distillation process.

8. In a continuous process for the concentration of a dilute aqueous solution of formaldehyde, the steps of distilling said solution in a distillation zone together with an oxygenated hydrocarbon derivative boiling between about 70° C. and about 300° C. and capable of forming a heterogeneous azeotrope with water, at a temperature above 100° C. and at superatmospheric pressure, to form overhead vapors, continuously withdrawing the overhead vapors, continuously withdrawing a kettle product of excess water and associated impurities, regulating the amount of water in the overhead vapors by the use of the oxygenated hydrocarbon, condensing and cooling the overhead vapors, thus effecting a re-solution of the uncondensed formaldehyde in the aqueous portion of the condensate, separating the oxygenated hydrocarbon-water-formaldehyde condensate into a concentrated formaldehyde solution layer and a liquid oxygenated hydrocarbon layer, continuously withdrawing the liquid oxygenated hydrocarbon layer and returning it to said distillation zone as reflux, and continuously withdrawing the formaldehyde solution of greater formaldehyde concentration than the said dilute aqueous solution of formaldehyde.

9. In a continuous process for the concentration of a dilute aqueous solution of formaldehyde, the steps of distilling said solution in a distillation zone together with an oxygenated hydrocarbon derivative boiling between about 70° C. and about 300° C. and capable of forming a heterogeneous azeotrope with water, at a temperature above 100° C. and at superatmospheric pressure, to form overhead vapors, continuously withdrawing the overhead vapors, continuously withdrawing the kettle product of excess water and associated impurities, regulating the amount of water in the overhead vapors by the use of the oxygenated hydrocarbon, condensing and cooling the overhead vapors, thus effecting a re-solution of the uncondensed formaldehyde in the aqueous portion of the condensate, separating the oxygenated hydrocarbon - water - formaldehyde condensate into a concentrated formaldehyde solution layer and a liquid oxygenated hydrocarbon layer, continuously withdrawing a portion of the concentrated formaldehyde solution layer and returning it with the liquid oxygenated hydrocarbon layer to the distillation zone as reflux.

10. In a continuous process for the concentration of a dilute aqueous solution of formaldehyde, the steps of distilling said solution in a distillation zone together with an oxygenated hydrocarbon derivative boiling between about 70° C. and 300° C. and capable of forming a heterogeneous azeotrope with water, at a temperature above 100° C. and at superatmospheric pressure, to form overhead vapors in which the water is limited and controlled by the oxygenated hydrocarbon, continuously withdrawing the overhead vapors, continuously withdrawing the kettle product of excess water and associated impurities, condensing and cooling the overhead vapors, thus effecting a re-solution of the uncondensed formaldehyde in the aqueous portion of the condensate, separating the oxygenated hydrocarbon - water - formaldehyde condensate into a formaldehyde solution layer and a liquid oxygenated hydrocarbon layer, and continuously withdrawing the formaldehyde solution produced containing an amount of formaldehyde of not less than 37.5% by weight of formaldehyde.

11. The process as defined in claim 10 in which the dilute aqueous solution of formaldehyde contains less than 37.5% formaldehyde by weight.

12. In a continuous process for the concentration of a dilute aqueous solution of formaldehyde, the steps of distilling said solution in a distillation zone together with an oxygenated hydrocarbon derivative boiling between about 70° C. and 300° C., having a specific gravity less than that of formaldehyde-water solution and capable of forming a heterogeneous azeotrope with water in which both the dilute aqueous solution of formaldehyde and the oxygenated hydrocarbon volatilize from the mixture at a temperature of from 102° C. to 150° C. and at superatmospheric pressure, to form overhead vapors, continuously withdrawing the overhead vapors, in which the water is limited and controlled by the oxygenated hydrocarbon, continuously withdrawing the kettle product of excess water and associated impurities, condensing and cooling the overhead vapors, thus effecting a re-solution of the uncondensed formaldehyde in the aqueous portion of the condensate, separating the oxygenated hydrocarbon-water-formaldehyde condensate into a concentrated formaldehyde solution lower layer and a liquid oxygenated hydrocarbon upper layer, continuously withdrawing the liquid oxygenated hydrocarbon upper layer and returning it to said distillation zone as reflux, and continuously withdrawing the formaldehyde solution lower layer of desired concentration.

13. In a continuous process for the concentration of a dilute aqueous solution of formaldehyde, the steps of distilling said solution in a distillation zone together with a hydrocarbon derivative containing oxygen, boiling from about 70° C. to about 300° C., having a greater specific gravity than formaldehyde and water solution and capable of forming a heterogeneous azeotrope with water, at a temperature above 100° C. and at superatmospheric pressure, to form overhead vapors, in which the water is limited and controlled by the oxygenated hydrocarbon, continuously withdrawing the overhead vapors, continuously withdrawing the kettle product of excess water and associated impurities, subjecting the overhead vapors to cooling and condensation, thus effecting a re-solution of the uncondensed formaldehyde in the aqueous portion of the condensate, separating the oxygenated hydorcarbon-water-formaldehyde condensate into a concentrated formaldehyde solution upper layer and a liquid oxygenated hydrocarbon lower layer and returning the liquid oxygenated hydrocarbon lower layer to the said distillation zone, and continuously withdrawing the concentrated formaldehyde solution upper layer of greater formaldehyde concentration than the starting dilute aqueous solution of formaldehyde.

14. The process as defined in claim 8 in which the hydrocarbon derivative is amyl acetate.

15. The process as defined in claim 8 in which the hydrocarbon derivative is methyl n-amyl ketone.

16. The process as defined in claim 8 in which the hydrocarbon derivative is iso-amyl ether.

SOON Y. WONG.

REFERENCES CITED

The following references are of record in the file of this patent:

UNITED STATES PATENTS

| Number | Name | Date |
|---|---|---|
| 1,905,033 | Bond | Apr. 25, 1933 |
| 1,948,069 | Fuchs et al. | Feb. 20, 1934 |
| 2,257,780 | Bludworth | Oct. 7, 1941 |

FOREIGN PATENTS

| Number | Country | Date |
|---|---|---|
| 479,255 | Great Britain | Feb. 2, 1938 |